Aug. 25, 1936.  L. BOUDIN  2,052,212
APPARATUS FOR THE CONTINUOUS MANUFACTURE OF SHEET GLASS
Filed Nov. 11, 1932
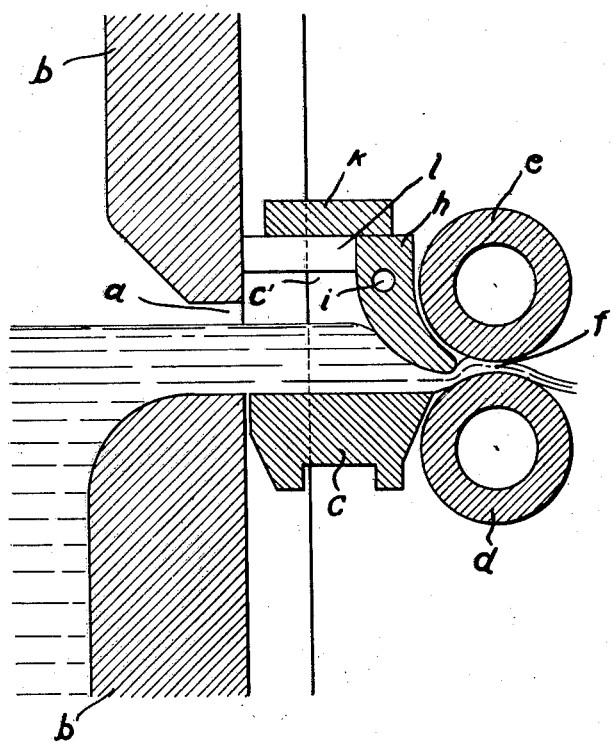
Inventor
LOUIS BOUDIN
By
Dorsey & Cole
Attorney Patented Aug. 25, 1936

2,052,212

UNITED STATES PATENT OFFICE 2,052,212

APPARATUS FOR THE CONTINUOUS MANUFACTURE OF SHEET GLASS

Louis Boudin, St. Gobain, France, assignor to Société Anonyme des Manufactures des Glaces & Produits Chimiques de Saint Gobain, Chauny & Cirey Application November 11, 1932, Serial No. 642,295
In France November 19, 1931

3 Claims. (Cl. 49—33)

In United States Patent No. 1,628,353, is described a process of and apparatus for the continuous manufacture of sheet glass wherein the molten glass issues from the furnace through a submerged outlet, or slot, into a forehearth of restricted length in which a meniscus is formed by the head of glass in the furnace. At the outer end of the forehearth is a forming pass between two rolls. In such a device the height of the meniscus in the forehearth is determined in part by the effective head of glass in the furnace; that is, by the vertical head less a resistance factor due to the throttling effect of the outlet slot; and in part by the amount of glass passing through the forming pass.

In the present invention the glass flows freely from the furnace into the forehearth through an opening in the furnace wall, to form a pool in the forehearth. It then flows through a throttling pass between a throttling member independent of and remote from the furnace wall, and the lower roll of the forming pass; the upper roll of the forming pass being located behind the throttling member and protected thereby from the heat of the glass in the pool and from the radiant heat emanating from the furnace wall. The molten glass flows from the pool through the throttling pass, urged both by pressure of the head of glass in the pool, and by the drag of the lower roll, so as to form a meniscus in the restricted area between the rolls and the outer lower edge of the lip of the throttling member.

My invention therefore consists in the apparatus by which the method above stated is carried out, as will be hereinafter more fully described and claimed.

Referring to the accompanying drawing, which is a vertical section through a device embodying my invention, and in which corresponding parts are designated by corresponding marks of reference, $b$ is the vertical wall of a furnace having therein a flow opening $a$ extending above and below the glass line. In the outside of this opening is a forehearth formed by the sill $c$, and side walls $c'$, above the latter of which are slide members $l$ fixed to the structural work of the furnace. Immediately at the outer end of the sill $c$ is the lower roll $d$ between which and the upper roll $e$ is the forming pass $f$ located above the level of the top of the sill. A lid $k$ is shiftable on the slide members $l$ in order to cover to a greater or less extent the glass in the forehearth and to thus control the temperature thereof. A throttling member $h$ extends across the outer end of the forehearth between the upper roll $e$ and the furnace wall $b$, being closely adjacent to the former, with its lower lip projecting downwardly to below the level of the glass in the forehearth and adjacent to the lower roll. The outer face of this block is preferably arcuate in vertical section to conform to the curvature of roll $e$, and, between the outer edge of its lower lip and the rolls $e$ and $d$, a relatively small chamber is formed which is occupied by the glass immediately before being fed to the forming pass. The glass is fed to this chamber by the head pressure from the forehearth and by the drag exerted on the glass in the throttling pass between the lower lip of the throttling member $h$ and the rotating lower roll. The throttling member $h$ is formed of refractory material and is provided with a cavity or passage $i$, by which its temperature may be controlled.

Advantages resulting from the described invention are:

1. The ability to increase the distance between the forming pass and the furnace wall, with consequent reduction of the heat to which the forming rolls are subjected. This becomes of greater importance when the upper roll is figured to produce pattern glass. This increase in distance also provides a longer forehearth and consequently a better opportunity to condition the glass as to temperature during the interval between its issuance from the furnace and its passage through the forming pass.

2. The ability to vary the position of the throttling member $h$ and secure a consequent variation in the effect thereof on the flow of glass to the forming pass.

3. The ability to control the temperature of the throttling member $h$ independently of the furnace wall while maintaining a proper temperature of glass in the forehearth by heat transmitted to the forehearth through the flow opening above the issuing glass.

Having thus described my invention, what I claim is:

1. In an apparatus of the class described, the combination with a glass furnace and a forehearth in free communication therewith at the glass level, of a glass throttling member in the outer end of the forehearth, the lower edge of such member extending below the level of the glass in the forehearth, a roll located below and outside of the lower edge of the throttling member and forming therewith a flow passage, and a second roll located above the first named roll and adjacent to the outer surface of the throttling member and forming with the first named roll a forming pass at a higher level than of the passage below the throttling member.

2. In an apparatus of the class described, the combination with a glass furnace and a forehearth in free communication therewith at the glass level, of a glass throttling member in the outer end of the forehearth, the lower edge of such member extending below the level of the glass in the forehearth, means for cooling the throttling member, a roll located below and outside of the lower edge of the throttling member and forming therewith a flow passage, and a second roll located above the first named roll and adjacent to the outer surface of the throttling member and forming with the first named roll a forming pass at a higher level than the flow passage.

3. In an apparatus of the class described, the combination with a glass furnace and a forehearth in free communication therewith at the glass level, of a glass throttling member in the outer end of the forehearth, the lower edge of such member extending below the level of the glass in the forehearth, means for cooling the throttling member, a roll located below and outside of the lower edge of the throttling member and forming therewith a flow passage, a second roll located above the first named roll and adjacent to the outer surface of the throttling member and forming with the first named roll a forming pass at a higher level than the flow passage and a lid extending across the forehearth and shiftable longitudinally over the glass level in said forehearth.

LOUIS BOUDIN.